United States Patent [19]

McVey

[11] 4,076,898

[45] Feb. 28, 1978

[54] Nb OR Ta COATED WITH FIRED Zr-Mo FOR METAL-CERAMIC SEALS

[75] Inventor: Charles I. McVey, Shaker Heights, Ohio

[73] Assignee: General Electric Company, Schenectady, N.Y.

[21] Appl. No.: 664,148

[22] Filed: Mar. 5, 1976

[51] Int. Cl.$^2$ ............................................. B22F 7/04
[52] U.S. Cl. ................................ 428/553; 75/177; 428/632; 428/662; 428/663
[58] Field of Search ............... 29/198, 194, 195 M; 75/177; 428/553, 632, 662, 663

[56] References Cited

U.S. PATENT DOCUMENTS

| | | | |
|---|---|---|---|
| 3,046,650 | 7/1962 | Heestand et al. | 75/177 X |
| 3,448,319 | 6/1969 | Louden | 313/221 |
| 3,479,158 | 11/1969 | Cook | 29/194 |
| 3,479,170 | 11/1969 | Louden | 65/59 |
| 3,504,426 | 4/1970 | Craig et al. | 29/198 X |
| 3,598,435 | 8/1971 | Jorgensen | 287/189.365 |
| 3,628,924 | 12/1971 | Nishio et al. | 29/198 X |

*Primary Examiner*—Arthur J. Steiner
*Attorney, Agent, or Firm*—Ernest W. Legree; Lawrence R. Kempton; Frank L. Neuhauser

[57] ABSTRACT

A coating of zirconium is bonded to niobium by applying to the niobium a paint of Mo and Zr powder which is fired above 1520° C but below the zirconium-niobium liquidus temperature of 1740° C. Such coating is used in making an improved seal by juxtaposing the metal body to the ceramic body, applying a powdered alumina sealing glass or frit and firing to the melting temperature of the frit.

4 Claims, 2 Drawing Figures

NB OR TA COATED WITH FIRED ZR-MO FOR METAL-CERAMIC SEALS

The invention generally relates to the art of forming seals between refractory metals and ceramics such as are used in sealing the ends of alumina ceramic lamps.

BACKGROUND OF THE INVENTION

The envelopes or arc tubes of high pressure sodium vapor lamps are generally made of alumina ceramic which can withstand the attack of sodium at high temperatures. The ends of the ceramic tubes may be sealed by metal end caps which serve as conductors and terminals for the electrodes, or by ceramic end plugs through which metal conductors are sealed. The refractory metals used are niobium and tantalum whose coefficients of thermal expansion are reasonably close to those of alumina ceramic from room temperature up to about 700 to 800° C which is the operating temperature of the seals in a high pressure sodium vapor lamp.

A sealing frit is used to cement the metal parts to the ceramic but it does not adhere well when applied directly to niobium or tantalum. However, when niobium is first coated with a sintered layer of tungsten and tungsten oxides and the sealing frit applied thereover as disclosed in U.S. Pat. No. 3,448,319 - Louden, a good seal is obtained. The tungsten and tungsten oxide coating tends to increase the hardness of the niobium and make it brittle, but this can be remedied by coating the outside of the end cap with zirconium hydride as taught in U.S. Pat. No. 3,479,170 - Louden. While the Louden seal is reliable and has been used commercially up to the present, its high labor content makes it relatively expensive and a cheaper seal is desired.

In another seal disclosed in U.S. Pat. No. 3,598,435 - Jorgensen, the refractory metal surface to be bonded to the alumina body has a layer of zirconium applied to it which forms an oxide upon contact that is incorporated into the sealing glass whereby adherence is promoted. The zirconium layer may be formed by coating the niobium with zirconium hydride which is then reduced to zirconium, or alternatively by zirconiding wherein an adherent coating of zirconium is formed on a niobium surface by electrodeposition in a fused salt bath. Notwithstanding the excellence of the Jorgensen seal, it has not been used commercially because the available processes, including the two previously mentioned, for forming a zirconium coating on a refractory metal such as niobium or tantalum were too involved and expensive.

SUMMARY OF THE INVENTION

The object of the invention is to provide an improved and more economical zirconium coating on a refractory metal body of niobium or tantalum which can be used to bond or seal the body to ceramic, or which can be used as a gettering coating.

In accordance with the invention, a zirconium layer is bonded to the surface of a refractory metal such as niobium or tantalum by applying a coating comprising zirconium powder to which a fraction of molybdenum powder has been added. The coating may be applied as a suspension or paint of the powders in a vaporizable fluid. The coating is fired in a non-oxidizing atmosphere at a temperature above 1520° C which is the zirconium-molybdenum minimum liquidus or melting temperature. The firing should be below the minimum liquidus temperature of zirconium and molybdenum with the substrate; in the case of niobium, this temperature is 1740° C. By the addition of molybdenum to the zirconium, there results at 1520° C a melting composition of Mo-Zr in which additional Zr is dissolved at temperatures above 1520° C. This permits intimate contact of the zirconium with the niobium substrate so that diffusion bonding can take place. Upon subsequent application and firing of alumina sealing glass or frit, a strong bond of zirconium to frit occurs. The high bond strength is probably due to partial decomposition of metal oxide from the frit and the formation of a $ZrO_2$ interface with the frit. It assures the integrity and reliability of a ceramic-to-metal seal such as that of a tubular ceramic lamp envelope to a niobium or tantalum end cap by an alumina sealing glass or frit.

DETAILED DESCRIPTION

Figure 1:
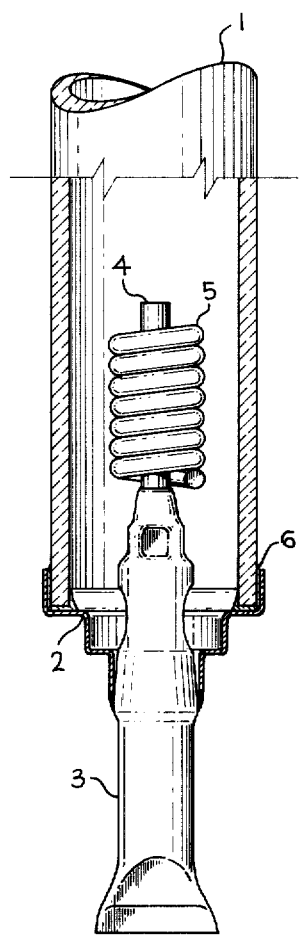
FIG. 1 is an enlarged partly sectioned view of an alumina arc tube end illustrating a metal-to-ceramic seal embodying the invention.

Referring to FIG. 1, the lower portion of the alumina ceramic arc tube of a high pressure sodium vapor lamp is illustrated in which a seal embodying the invention is used. Arc tube 1 may consist of translucent polycrystalline or transparent monocrystalline alumina ceramic. Refractory metal end cap 2 is of niobium or of an alloy of niobium with a low percentage of zirconium. The electrode assembly comprises a niobium tube 3 extending through the necked portion of the end cap, and the electrode proper comprising a tungsten shank 4 projecting from tube 3 and a tungsten wire coil 5 mounted on the shank. The end cap 2 is sealed to the end of the arc tube by means of sealing glass or frit shown at 6 which is bonded to the surface of the end cap and to the surface of the arc tube contiguous thereto.

The features of the improved coating of the invention and of the process for making it will be readily understood from the following description of the procedure utilized in making the illustrated seal embodying the invention. A mill charge was prepared as follows:

5 grams Mo powder
20 grams ZrH powder
25 ml ethylene glycol monoethyl ether (Cellosolve)

The charge was milled 2½ hours, allowed to settle overnight, and 6 ml of thinner was decanted. The Mo-ZrH slurry was then painted onto the inner surface of end cap 2 in the region where it engages the alumina tube. The end caps consisting of niobium with 1% zirconium were then vacuum fired at 1600° C for 5 minutes. The seals were then made in known fashion by placing a preformed ring of pressed sealing frit into an end cap, juxtaposing the end of the arc tube and firing in a high vacuum furnace to a temperature of about 1500° C. At this temperature the sealing washer melts and spreads out between the mating surfaces of the arc tube 1 and the niobium end cap 2 and fills the joint as indicated at 6. The sealing glass or frit of which the washer was made is that disclosed in U.S. Pat. No. 3,588,577 - McVey et al., and consists of 36% CaO, 45% $Al_2O_3$, 5% MgO, and 14% BaO. Good seal strength was observed on destructive analysis and seal integrity has been maintained on life tests.

While ZrH powder is preferred for the charge because it is less pyrophoric than Zr metal powder, the latter may also be used as well as other thermally decomposable compounds of Zr. The hydrogen or other gases are driven off at firing and only Zr and Mo remain. Where the substrate is tantalum, the firing temperature should not exceed the minimum liquidus temperature of Zr or Mo with Ta, approximately 1820° C. The zirconium may be partly substituted by hafnium if desired.

Figure 2:
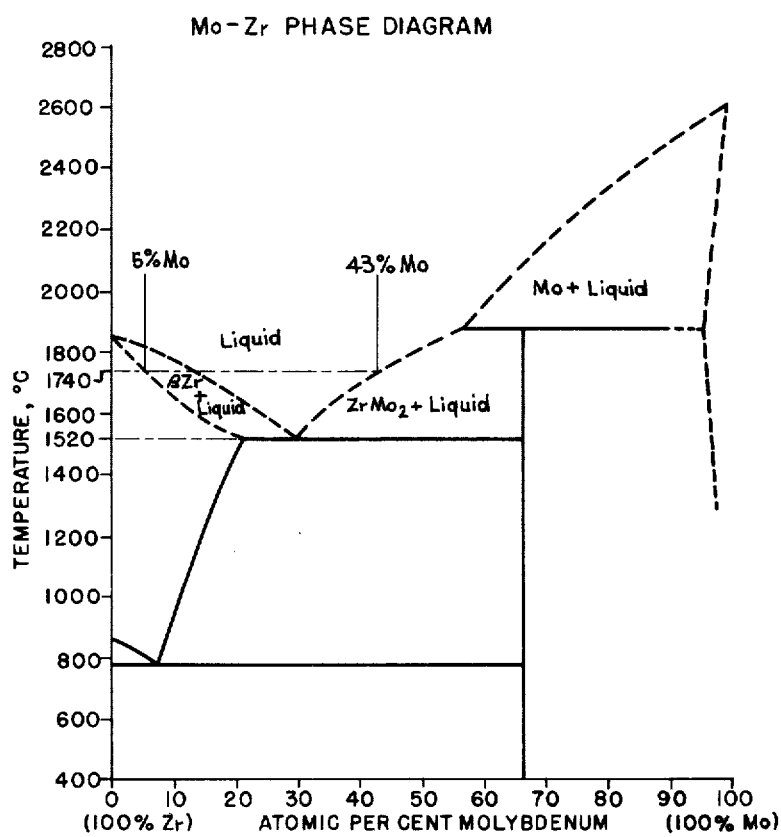
FIG. 2 is a phase diagram of the molybdenum-zirconium system.

Additional coatings have been prepared with various atomic percentages of molybdenum relative to zirconium. A percentage of molybdenum high enough to assure melting below 1740° C which is the zirconium-niobium liquidus temperature, is desirable; if the temperature is taken above 1740° C, the niobium cup 2 is subject to attack which may result in excessively thin or perforated walls. It is preferred to stay on the low Mo side of the Zr-Mo eutectic mixture consisting of 30 atom percent molybdenum which has a melting temperature of 1520° C. On the high side, the intermetallic compound $ZrMo_2$ is formed during the heat treatment which is undesirable because it tends to cause cracks and fissures in the metallic coating or layer. Referring to the phase diagram of FIG. 2, it is seen that at 1740° C, a liquid containing Zr in the crystal form or a pure liquid is obtained over the range from about 5% Mo to 43% Mo and coatings may be obtained throughout this range. However, in order to avoid the formation of $ZrMo_2$ on cooling, it is preferred to utilize the range from about 5% Mo to 30% Mo.

In coating tantalum with zirconium containing a minor percentage of molybdenum, the same general considerations hold with due allowance for the difference in the zirconium-tantalum liquidus temperature which is about 1820° C. The range in which liquid is obtained is from about 2% Mo to 50% Mo and the preferred range is from about 2% to 30% Mo.

My invention is generally useful in applying a strongly adherent coating of zirconium to niobium or tantalum and finds other applications besides assuring adherence of sealing frit. For instance, in sealing niobium end caps to ceramic tube ends, the niobium tends to increase in hardness and become brittle, probably as a result of absorption of oxygen. Also the niobium exhaust tube may become brittle and fragile to the point where it can no longer be cold-welded. A solution to this problem taught by U.S. Pat. No. 3,479,170 - Louden, is to coat zirconium hydride on the outside of the niobium end cap and exhaust tube prior to sealing the end cap to the alumina tube by vacuum firing. The ZrH serves as a getter for the excess oxygen in the niobium. The Louden patent applied the zirconium hydride as a "paint" or slurry in an acrylic binder; however the paint and particularly the fired product had poor adherence to the niobium during and after the firing. I have found that the method and composition of my invention wherein the zirconium contains a low percentage of molybdenum may be used to getter the excess oxygen from the niobium without the above-described variability. The zirconium and molybdenum paint is applied to the outside of end cap 2 and also of exhaust tube 3. Upon firing, it getters excess oxygen and reduces the hardness of the end cap and of the exhaust tube and allows cold welding of the latter.

What I claim as new and desire to secure by Letters Patent of the United States is:

1. A strongly adherent surface layer on a substrate of niobium or tantalum, said surface layer consisting of a powder mixture of zirconium and from about 2 to 50 atom percent of molybdenum fired in a non-oxidizing atmosphere at a temperature above 1520° C but not above the minimum liquidus temperature of zirconium and molybdenum with the substrate.

2. A surface layer as in claim 1 on a substrate of niobium wherein the mixture comprises from about 5 to 43 atom percent Mo and is fired at a temperature not above about 1740° C.

3. A surface layer as in claim 2 wherein the mixture comprises from about 5 to 30 atom percent Mo.

4. A surface layer as in claim 1 wherein the mixture comprises from about 2 to 30 atom percent Mo.

* * * * *